W. STOECKICHT.
GEARING.
APPLICATION FILED JULY 14, 1921.

1,416,905. Patented May 23, 1922.

Inventor:
Wilhelm Stoeckicht
By [signature]
Attorney

UNITED STATES PATENT OFFICE.

WILHELM STOECKICHT, OF MUNICH, GERMANY.

GEARING.

1,416,905. Specification of Letters Patent. Patented May 23, 1922.

Application filed July 14, 1921. Serial No. 484,719.

*To all whom it may concern:*

Be it known that I, WILHELM STOECKICHT, a subject of the State of Prussia, residing at Munich, in the State of Bavaria and German Republic, have invented certain new and useful Improvements in Gearing, (for which I have filed application in Germany May 20, 1920,) of which the following is a specification.

This invention relates to a friction gearing in which the frictional circumferential surface of at least one of the gear wheels is curved in the axial direction of the wheel, in such a manner that the tangent intersects the rotary axes of the two wheels at the point of contact of the frictional surfaces. The invention proper consists in the one wheel being positively displaced along its axle and during such displacement transmitting to the other wheel a power which is proportional to the turning moment of the driving shaft, the power transmission being thus a function of the turning moment.

Figure 1:
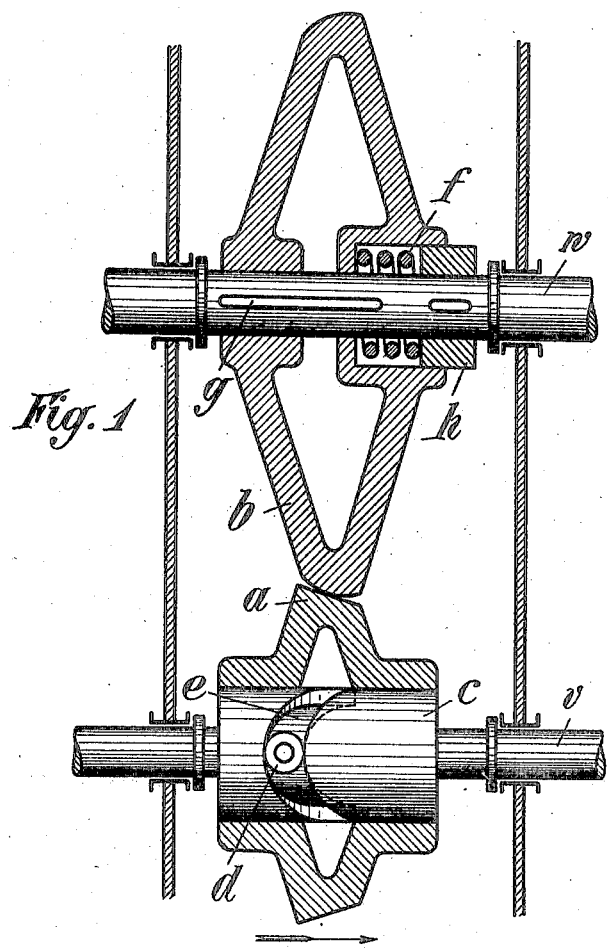
Figure 2:
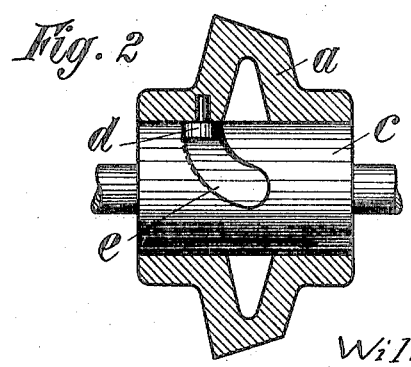

In order to make my invention more clear, I refer to the accompanying drawing, in which Figure 1 is an axial section through one form of construction of the improved gearing shown as an example, and Figure 2 is a similar section solely through the smaller of the two wheels, the section lying at right angles to that of Figure 1.

$a$ and $b$ are the two friction wheels, of which the wheel $a$ is affixed to the driving shaft $v$, while the wheel $b$ is affixed to the driven shaft $w$. The shaft $v$ is firmly connected with a cylindrical member $c$ having a semicircular groove $e$. The wheel $a$ is supported by said member $c$ and provided with a roll $d$ engaging the groove $e$. The roll is held in place by a pivot projecting forth from the inner surface of the hub of the wheel. Instead of the roll an appropriately thick pinion may be made use of.

The wheel $a$ sits loosely upon the member $c$ and is connected with it solely by the roll $d$, in that this latter engages the groove $e$, as already described. Owing to this kind of connection, the wheel $a$ is capable of a rotary motion upon the member $c$, as well as of an axial motion, the resultant motion being practically directed towards the wheel $b$.

This latter wheel is either firmly attached to the shaft $w$ or capable of a certain axial displacement, as is the case in the form of construction shown in the drawing. The wheel $b$ is here under the pressure of a spring $f$ which tends to displace the wheel $b$ in a direction opposite to the direction of action of the groove $d$ with respect to the roll $d$ and the wheel $a$. The outer end of the spring $f$ lies against a collar $h$ fixed to the shaft $w$. I wish it to be understood that the spring $f$ is not indispensably requisite, because the wheel $b$ may be firmly secured to the shaft $w$, as already mentioned, and, furthermore, it is not absolutely necessary that the wheels $a$ and $b$ cooperate directly with one another; the rotation may be transmitted, if desired or preferred, by one or more intermediate wheels, as the case may be. It is a matter of course that the device claimed may also be applied to frictional reversing gears, as well as to change-speed gears.

The manner of operation is as follows: During standstill or running without load the position of the wheel $a$ relative to the cylindrical member $c$ is such that the roll $d$ is in the vertex of the groove $e$, as in Figures 1 and 2. If now the shaft $v$ is turned in the one or the other direction, the groove $e$ tends to move the roll $d$, and, thus, the wheel $a$, too, in the direction of the arrow. The intensity of the shearing force depends upon the pitch of the groove and is proportional to the peripheral power, or to the turning moment to be transmitted respectively.

The wheel $a$ is displaced upon the member $c$ until the counter-pressure of the wheel $b$, or of the spring $f$ respectively, balances the axial shearing power of the wheel. The power with which the two wheels are pressed one against the other is always proportional to the turning moment to be transmitted. The point-contact of the curved circumferential surface of the wheel $b$ with the conical circumferential surface of the wheel $a$ enables an exact determination of the gear ratio. The inclination of the curved surface at right angles to the periphery of the wheel $b$ which is expressed by the inclination of the tangent relatively to the axles of the friction wheels is so chosen that a positive power transmission from the wheel $a$ to the wheel $b$ without any slip is obtained.

I wish it also to be understood that instead of the wheel $b$ the wheel $a$ may have a curved rim, or that, besides the wheel $b$, also the wheel $a$ may have such a rim. Furthermore, there may be two curved grooves such as $e$, the second being then provided within the opposite half of the cylindrical member $c$.

Having now described my invention, what I desire to secure by a patent of the United States is:

1. Friction gearing, consisting of a driving shaft provided with a relatively-short peripheral groove; a driving wheel mounted immediately on the grooved portion of said shaft and having a single projection for coaction with said groove which is normally disposed at the center of the groove and is adapted to travel toward either end thereof when the rotation of the shaft commences, according to the direction of such rotation, and to maintain its end position throughout the continuation of the rotation; a driven shaft; and a wheel coupled to the driven shaft to rotate therewith and adapted to be driven from the driving wheel, the direction of said groove with relation to the axis of the driving shaft being such as to cause the driving wheel to move along said driving shaft toward the driven wheel so as to transmit to the latter a power which is proportional to the torque of the driving shaft.

2. Friction gearing, comprising, in combination; a driving shaft; a cylindrical member affixed to said shaft and provided with a semicircular groove having its vortex in the neighbourhood of one end face of said member and its legs directed towards the opposite end face thereof; a driving wheel loosely encompassing the said member; a projection attached to the inner surface of the hub of the driving wheel and adapted to transmit the power from the cylindrical member to the driving wheel and both to rotate and to shift said driving wheel axially; a driven shaft; and a driven wheel coupled to said driven shaft so as to rotate therewith and being in circumferential contact with the said driving wheel; at least one of said wheels having a rim which is curved in the direction of the shaft of that wheel.

3. Friction gearing, comprising, in combination; a driving shaft provided with a groove extending at an angle with respect to the axis of the shaft; a driving wheel encompassing loosely the shaft portion having said groove; a projection affixed to said wheel and extending into said groove; a driven shaft; a driven wheel coupled to said driven shaft and adapted to be axially displaced along it; and a spring so arranged as to counteract the displacement of the driven wheel; said driven wheel being in circumferential contact with said driving wheel, and one of said wheels having a rim which is curved in the direction of the shaft of that wheel, for the purpose set forth.

4. Friction gearing, comprising, in combination; a driving shaft; a cylindrical member affixed to said shaft and provided with a semicircular groove having its vortex in the neighborhood of one end face of said member and its legs directed towards the opposite end face thereof; a driving wheel loosely encompassing the said member; a projection attached to the inner surface of the hub of the driving wheel and adapted to transmit the power from the cylindrical member to the driving wheel and both to rotate and to shift said driving wheel axially; a driven shaft; a driven wheel coupled to said driven shaft and adapted to be axially displaced along it; and a spring so arranged as to counteract the displacement of the driven wheel; said driven wheel being in circumferential contact with said driving wheel and having a rim which is curved in the direction of the shaft of the driven wheel, substantially as described and shown.

5. Friction gearing, as claimed in claim 1, in which the groove in the driving shaft is of semicircular form.

In testimony whereof I have affixed signature in presence of two witnesses.

WILHELM STOECKICHT.

Witnesses:
P. PAUL DREY,
RICHARD LUTZ.